United States Patent [19]
Arrigoni et al.

[11] 3,942,359
[45] Mar. 9, 1976

[54] METHOD AND APPARATUS FOR MEASURING KNOCKING IN INTERNAL COMBUSTION ENGINES

[75] Inventors: Virgilio Arrigoni, San Donato Milanese; Bruno Gaetani; Pietro Ghezzi, both of Milan, all of Italy

[73] Assignee: Snamprogetti S.p.A., San Donato Milanese, Italy

[22] Filed: Nov. 8, 1974

[21] Appl. No.: 522,272

Related U.S. Application Data

[63] Continuation-in-part of Ser. No. 182,673, Sept. 22, 1971, abandoned.

[30] Foreign Application Priority Data
Sept. 22, 1970 Italy.................................. 30020/70

[52] U.S. Cl. .................................................. 73/35
[51] Int. Cl.² ........................................ G01L 23/22
[58] Field of Search ......................................... 73/35

[56] References Cited
UNITED STATES PATENTS

| 2,291,045 | 7/1942 | Lancor | 73/35 |
| 2,607,215 | 8/1952 | DeBoisblanc | 73/35 |
| 2,879,665 | 3/1959 | Adams | 73/35 |

Primary Examiner—James J. Gill
Attorney, Agent, or Firm—Ralph M. Watson

[57] ABSTRACT

A system is disclosed through which knocking in an internal combustion engine is quantitatively measured by detecting engine vibrations with an accelerometer, transmitting the accelerometer signal to an elaboration network including an amplifier and a filter, transmitting an ignition pulse to a control network, transmitting the output from the elaboration network through a gate only during coincidence of a signal from the control network, the output of the control network corresponding to the angle of revolution of the crankshaft during which knocking usually occurs, and detecting the output signal from the gate.

5 Claims, 1 Drawing Figure

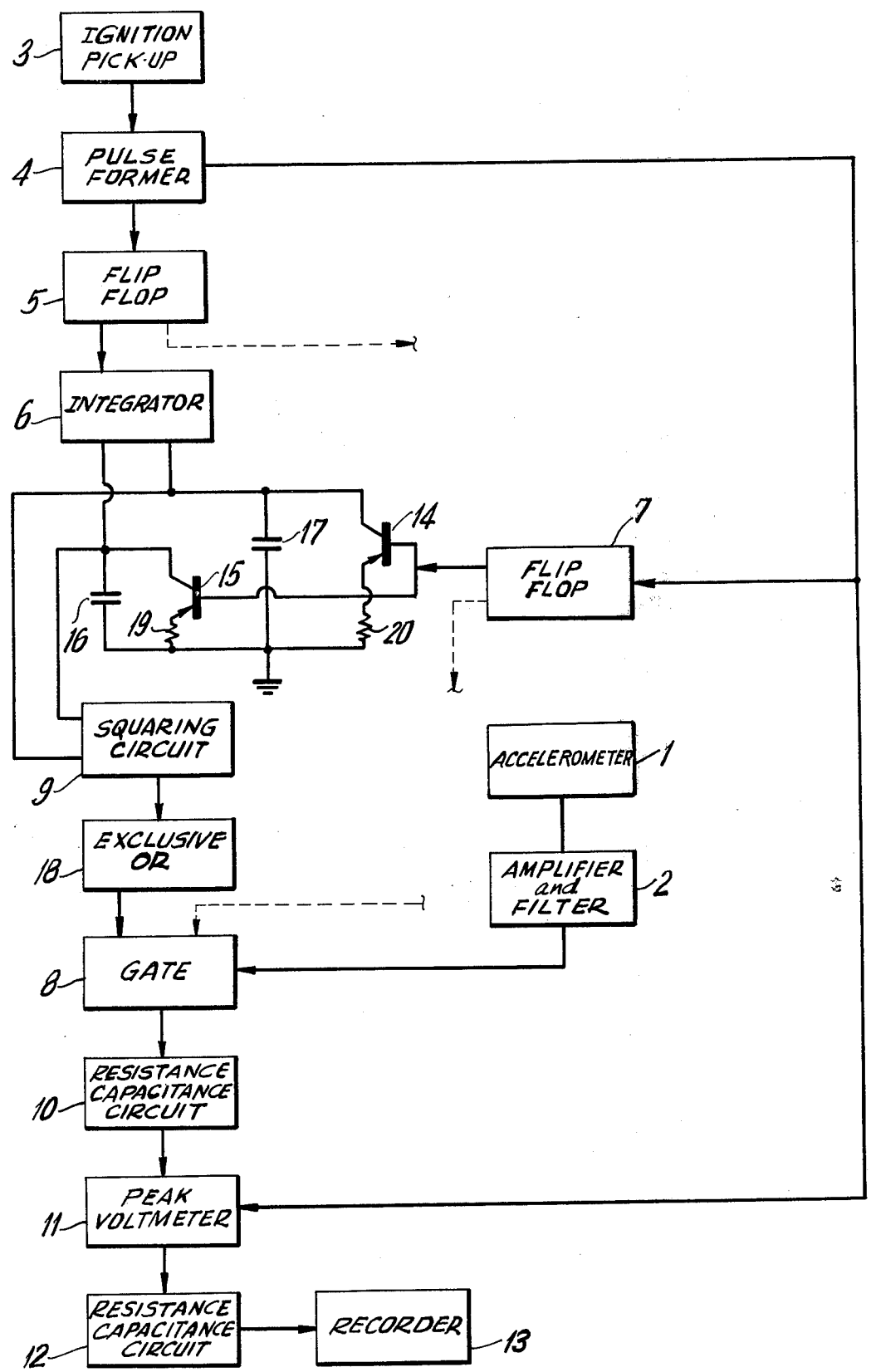

METHOD AND APPARATUS FOR MEASURING KNOCKING IN INTERNAL COMBUSTION ENGINES

This application is a continuation-in-part of our co-pending application Ser. No. 182,673, filed Sept. 22, 1971, now abandoned.

The present invention relates to internal combustion engines and more specifically to a method and apparatus for quantitatively measuring knocking in internal combustion engines.

Recently, the problem of measuring knocking in internal engines being run at high speeds has been the subject of much consideration. Experimental apparatus have been provided, some of which allow a quantitative appraisal of the knocking phenomenon.

Generally, those apparatus which include a survey of the pressure in a combustion chamber have provided good results. However, to obtain an accurate survey of the pressure variations which characterize knocking it is necessary to connect a transducer to the combustion chamber. Such a procedure requires the use of a special head including a hole for positioning the transducer. Therefore, different heads are required for different size engines. Connection ducts are generally unsuitable since their presence generally causes resonance which masks the phenomenon under study.

For obtaining measurements on numerous cars, as is necessary for investigating the octane requirement of cars in service, or on engines where the insertion of a transducer is impossible, other systems have been investigaged, e.g., a survey of the temperature, the trend of the ionization and, particularly, a survey of the mechanical vibrations of the walls of the combustion chambers. This last method appears to be the most promising, since a simple accelerometer may be used for measuring vibration.

However, the measurements so far obtained by the aforementioned methods are not quantized, but are estimated by determining the irregularities and the peaks which are present in a recording of the level of vibration for a predetermined frequency.

It is an object of the present invention to suppress the noise accompanying knocking measurements to provide a direct and quantitative measurement of knocking both at constant speed and during acceleration.

The present invention makes use of signal sampling techniques to provide a method and apparatus for detecting knocking in internal combustion engines which allows a direct and quantitative measurement of knocking both at constant speed and during accelerations with remarkable advantages of precision and simplicity of measurement. Means is provided to improve the signal to noise ratio and permit the passage of the signals only at time intervals corresponding to the crank-angle during which the vibrations resulting from knocking occur. This angle generally extends between about 60° to about 80°, preferably about 70°, beyond the highest pressure point.

It has been observed that the angle between the ignition spark point and the highest pressure point remains substantially constant with variations in speed and acceleration. Generally the highest pressure point is displaced between about 40° and about 50° from the ignition spark point. With a suitable delay of the ignition spark, an electronic gate is triggered in correspondence with the point of highest pressure. The duration of the gate output corresponds to the angle during which knocking will occur. The signals resulting from vibration are blocked from transmission during the remainder of the ignition cycle, when only noise is present.

The improvement in the signal to noise ratio provided by the present invention allows a vibration measurement with a residual noise (ground noise) which is no greater than that measured by using conventional pressure measurement techniques. Moreover, with the system of the present invention, a simple band-pass filter having a passband between about 5 and about 10 KHz is sufficient, and conventional elements may be utilized for the accelerometer and amplifier of the elaboration network.

The method which is the subject of the present invention includes the steps of detecting the vibrations of the engine by means of an accelerometer mounted on the internal combustion engine, transmitting the output signals from the accelerometer to an elaboration network in which the signals are amplified and filtered, transmitting the output from a control network to a gate, the control network output corresponding to the angle of revolution of the crankshaft during which knocking usually occurs, transmitting the signals resulting from the elaboration network through the gate only during coincidence of a signal from the control network, detecting the output vibration signal from the gate with a suitable detector, and recording the detected signal, as desired.

The apparatus according to the present invention includes, a transducer for the detection of mechanical vibrations, elaboration means for receiving the output from the transducer, the elaboration means including an amplifier and a filter, control means for receipt of an ignition pulse, gate means, and means for detecting the output from the gate means.

The present invention is illustrated in the accompanying drawing. An accelerometer 1, which may be of the piezo-electric type, is mounted on the internal combustion engine (not shown) whose knocking is to be measured, e.g., by mounting the accelerometer on one of the central clamping bolts of the engine head. The accelerometer 1 detects engine vibrations and transmits corresponding electrical signals to an amplifier and filter indicated at 2. The filter may be a bandpass filter having a passband of between about 5 and about 10KHz. The output signal from the amplifier and filter 2 is transmitted to a gate circuit 8, e.g., an AND gate. The gate 8 is synchronized with the ignition system of the present invention as will be explained in more detail below. The output signal from the gate 8 is applied to a resistance-capacitance circuit 10, preferably having a time constant of about 2 seconds, for averaging the output signals from the gate 8. Such resistance-capacitance circuits are well known in the art, see *Electronics and Nucleonics Dictionary*, John Markus, McGraw Hill (1966) at p. 553.

The output from the resistance-capacitance circuit 10 is applied to a peak voltmeter 11 which reads the peak value of the a.c. signal input. Peak voltmeters are well known in the art, see *Electronics and Nucleonics Dictionary*, supra, at p. 460. The output signal from the peak voltmeter 11 is averaged in another resistance-capacitance circuit 12, preferably having a time constant of about 2 seconds. The output signal from circuit 12 is applied to a conventional recorder 13, e.g., a fast potentiometer recorder, to provide a permanent record of the knocking intensity as a function of time.

The gate 8 permits passage of the output from the amplifier and filter 2 only during the time period which corresponds to the crankshaft displacement angle when vibrations due to knocking are present. To accomplish this, the opening of the gate 8 is synchronized with the ignition pulse and occurs after a predetermined phase displacement of the ignition pulse which coincides with the highest pressure point. The time during which the gate 8 is open corresponds to the normal duration of the vibrations due to knocking and generally corresponds to the crankshaft angle between about 60° to about 80°, preferably about 70°, beyond the highest pressure point.

The input signal to the gate 8 is obtained from the ignition (distributor) in the following manner. An ignition pickup 3 provides an output pulse for each spark ignition pulse. The output pulse from the probe 3 is shaped and regularized in a pulse former or relaxation oscillator 4. Relaxation oscillators are well known in the art, see *Electronics and Nucleonics Dictionary*, supra, at p. 549.

The output from the pulse former 4 is applied to a bistable means, e.g., a flip-flop 5. The flip-flop 5, as is well known in the art, provides an output at its first output and another output having the same shape but of the opposite phase at its second output. The flip-flop 5 is set (1,0) and reset (0,1) in response to each input ignition pulse.

Only the conditioning of the output from the first output of the flip-flop 5 will be considered. The signal from the second output (dotted line in the drawing) is similarly conditioned, but undergoes a phase shift of 180°.

The signal resulting from the first output of the flip-flop 5 is electrically coupled to a conventional integrator 6. The input signal to the integrator 6 is integrated for a half-cycle (first state) to provide a final signal inversely proportional to the velocity of the crankshaft; the integrator is reset at the next half cycle.

The output from the integrator 6 is subdivided into two decoupled outputs and applied at the same time to capacitors 16 and 17. Capacitor 16 is coupled at one terminal to one of the outputs of the integrator 6 and the collector of transistor (PNP) 15, and at its other terminal to the emitter of the transistor 15 through a suitable resistor 19. Capacitor 17 is coupled at one terminal to the other output of the integrator 6 and the collector of transistor (PNP) 14. The other terminal of capacitor 17 is coupled to the emitter of the transistor 14 through a suitable resistor 20. Thus, the transistors 14 and 15 are arranged in a common collector configuration. The second terminals of capacitors 16 and 17 are grounded.

Capacitors 16 and 17 are charged during the integration performed by integrator 6 and discharge at constant current during the half-cycle subsequent to the half-cycle of integration performed by integrator 6. The constant current discharges are effected through the common collector stage transistors 14 and 15 by a pilot control flip-flop 7, and the current discharge of capacitor 16 is different from that of capacitor 17. The flip-flop 7 is coupled to the bases of transistors 14 and 15 to provide a constant current output to the transistors 14 and 15 to maintain them at constant voltage in the half-cycle following the charging in the capacitors 16 and 17.

The instant when capacitor 16 reaches a constant voltage value (at the end of the discharge) gate 8 is opened via logic circuitry, including a squaring circuit 9 and an EXCLUSIVE OR circuit 18. Gate 8 is closed the instant that capacitor 17 is completely discharged.

The logic circuitry which controls the gate 8 includes a pair of squaring amplifiers whose output is electrically coupled to an EXCLUSIVE OR gate. The squaring amplifiers transform triangular signals from the capacitors 16 and 17 into rectangular signals which are then applied to the EXCLUSIVE OR gate, well known in the art. Squaring amplifiers are also well known in the art, see *Transistor Circuits In Electronics*, by S. S. Hakim, London Iliffe Books Ltd., New York Hayden Book Co., Inc. (1964) at p. 195.

The opening of the gate 8 occurs during a certain phase displacement of the ignition pulse as determined by the capacitors 16 and 17 and the common collector stage so that the output of the gate 8 coincides with that portion of the ignition cycle in which the effects of knocking are detectable, preferably a crankshaft displacement between the highest pressure point and a angle of about 70°. During the remainder of the ignition cycle the output from the amplifier and filter 2 is prevented from passing through the gate 8.

The output signal from the gate 8 is averaged in the resistance-capacitance circuit 10, and transmitted to the peak voltmeter 11. The peak voltmeter 11, as well as pilot flip-flop 7, is reset by the pulse former 4 which provides a pulse of approximately 1 millisecond.

The output signal from the voltmeter 11 is averaged in the resistance-capacitance circuit 12 to improve accuracy and applied to the recorder 13. A time constant of approximately two seconds for the circuit 12 provides sufficient averaging to obtain a recording with desired regularity while preventing any prolonged delay in detecting knocking during acceleration.

It should be understood by those skilled in the art that various modifications may be made in the present invention without departing from the spirit and scope thereof, as described in the specification and defined in the appended claims.

What is claimed is:

1. A method for quantitatively measuring the knocking in an internal combustion engine, comprising the steps of:
   a. sensing engine vibration;
   b. generating electrical signals corresponding to engine vibration;
   c. filtering the generated electrical signals to pass a predetermined band of signals;
   d. transmitting the filtered signals to one input of a coincident gate;
   e. sensing ignition signals applied to the engine;
   f. generating pulses corresponding to each ignition signal applied to the engine;
   g. integrating the generated pulses to provide signals inversely proportional to the velocity of the crankshaft of the engine;
   h. transmitting the integrated signals of a pair of capacitors having different discharge rates for charging the same;
   i. discharging the capacitors at constant currents and different rates to provide a coincident signal to another input of the coincident gate only during the time period between complete discharge of one capacitor and complete discharge of the other capacitor, the time period commencing at the highest pressure point and terminating at a crankshaft angle of between about 60° to about 80° beyond the highest pressure point;

j. passing engine vibration signals through the coincident gate only during the coincidence of signals at its inputs; and k. detecting the output signals from the coincident gate to provide a quantitative measurement of knocking.

2. An apparatus for measuring knocking in an internal combustion engine, comprising:

sensor means coupled to the engine for generating electrical signals corresponding to engine vibration;

filter means for filtering the generated electrical signals to pass a predetermined band of signals;

coincident gate means for receiving the filtered signals to provide an output only during the presence of coincident signals at its inputs;

pulse generating means for generating pulses corresponding to each ignition signal applied to the engine;

integrating means for integrating the pulses to provide signals inversely proportional to the velocity of the crankshaft of the engine;

a control circuit for receiving the integrated signals from said integrating means, said control circuit including a pair of transistors arranged in a common collector configuration and having a pair of capacitors with one of said capacitors being electrically coupled to one transistor and the other capacitor being electrically coupled to the other capacitor to provide discharge of said capacitors at constant current, said capacitors having different discharge rates to provide an input signal to said coincident gate means only during the time period between complete discharge of said first capacitor and complete discharge of said second capacitor, the complete discharge of said first capacitor commencing at the highest pressure point and the complete discharge of said second capacitor terminating at between about 60° to about 80° beyond the highest pressure point; and detecting means for detecting the signals present at the output of said coincident gate means to provide a quantitative measurement of knocking.

3. The apparatus of claim 2, wherein:

said control circuit includes a flip-flop electrically coupled to the bases of said transistors to hold the transistors at constant voltage during discharge of said capacitors.

4. The apparatus of claim 3, wherein:

said pulse generating means means is electrically coupled to said flip-flop.

5. The apparatus of claim 2 including:

signal squaring means coupled to said capacitors for squaring the signals therefrom; and an EXCLUSIVE OR circuit electrically coupling said signal squaring means to said gate means.

* * * * *

UNITED STATES PATENT AND TRADEMARK OFFICE
CERTIFICATE OF CORRECTION

PATENT NO. : 3,942,359
DATED : March 9, 1976
INVENTOR(S) : Virgilio Arrigoni, Bruno Gaetani and Pietro Ghezzi It is certified that error appears in the above-identified patent and that said Letters Patent are hereby corrected as shown below:

Column 4, line 58, after "signals" change "of" to --to--.

Column 6, line 23, "means" appears twice.

Signed and Sealed this

Thirty-first Day of August 1976

[SEAL]

Attest:

RUTH C. MASON
Attesting Officer

C. MARSHALL DANN
Commissioner of Patents and Trademarks